Patented Aug. 20, 1946

2,406,195

UNITED STATES PATENT OFFICE 2,406,195

MANUFACTURE OF THE HIGHER CHLORIDES OF METHANE

Oliver W. Cass, Niagara Falls, N. Y., assignor to E. I. du Pont de Nemours & Company, Wilmington, Del., a corporation of Delaware No Drawing. Application February 17, 1944, Serial No. 522,799

2 Claims. (Cl. 260—657)

This invention relates to a new and improved process for preparing halogenated organic compounds. More particularly, it relates to a new and improved method for preparing the higher chlorides of methane, such as methylene chloride, $CH_2Cl_2$; chloroform, $CHCl_3$; and carbon tetrachloride, $CCl_4$.

My invention is primarily concerned with a new and improved procedure for the chlorination of methane, methyl chloride, or mixtures of these two compounds in varying proportions, whereby mixtures of the desired higher halide derivatives of methane result. By the utilization of my improved process for producing these higher chlorides of methane, it is possible to secure yields of chlorinated products that are much higher, from the viewpoint of the amount of available chlorine utilized to form valuable products, than previously possible.

It is well understood in the art that the higher halides of methane, particularly methylene chloride, chloroform, and carbon tetrachloride, may be readily prepared by chlorinating methane, a lower chlorinated methane halide such as methyl chloride, or by the chlorination of mixtures of these compounds. This chlorination reaction has been carried out in a number of ways, such as by reacting the starting materials at an elevated temperature in the absence of any catalytic or activating agent; by reacting the starting materials at a moderately elevated temperture in the presence of catalytic agents possessing large surface areas such as activated carbon; or by carrying out the reaction at still lower temperatures in the presence of actinic radiation as an activating agent. Regardless of the particular procedure adopted, the fundamental reaction involves a substitution of chlorine for hydrogen atoms in methane or methyl chloride with the formation of the higher chlorides of methane and the simultaneous production of hydrogen chloride as a by-product. In practice the chlorination reaction is ordinarily incomplete, as, in order to control the heat of the reaction, only a portion of the starting material, whether that material be methane, methyl chloride, or a mixture of the two, is chlorinated per pass through the reaction system. It is evident, however, that an inherent defect in the economical operation of this process by any of the procedures specified is the production of the relatively worthless compound, hydrogen chloride, as a by-product, this product being produced in amount equivalent to half of the chlorine supplied to the process.

In previous attempts to overcome this inherent difficulty in the chlorination process, it has been proposed to admix the entire reaction mixture resulting from such a chlorination with an amount of methanol essentially equivalent to the hydrogen chloride content of the reaction mixture. The mixed gases were then passed through a reaction chamber containing catalytic material, for example alumina gel or fused zinc chloride, in which chamber a reaction between the vaporized methanol and hydrogen chloride occurred, this reaction resulting in the formation of further amounts of methyl chloride and water, the latter being formed as a by-product. In this previously suggested process the final reaction product was then separated into the following constituents: (1) the water, containing unreacted hydrogen chloride and methanol; (2) the higher halides of methane, including methylene chloride, chloroform, and carbon tetrachloride; and (3) the methane or methyl chloride, or mixture of the two. In utilizing this process it was then necessary to dry both the higher halides of methane component, as well as the gaseous mixture of methane, methyl chloride, or mixture of methane and methyl chloride. The dried higher halides of methane could then be worked up by known methods, while the gaseous mixture was again recycled to the chlorination process. By utilizing this procedure it was possible to recover at least a portion of the hydrogen chloride formed as by-product in the substitution chlorination reaction in the form of methyl chloride, which could then be utilized in subsequent chlorinations.

However, in the practical operation of such a process, particularly on the industrial scale, a large number of difficulties are encountered. In the original chlorination reaction, especially when the chlorination is conducted at relatively high temperatures, or with relatively high ratios of chlorine to the amount of the other reactants, small quantities of carbon as well as high boiling condensation products are formed. These materials tend to accumulate upon or in the catalyst mass which is utilized after the vaporized methanol has been added to the reaction product in order to bring about reaction between the methanol and the by-product hydrogen chloride to form further amounts of methyl chloride. As a consequence the catalyst mass becomes fouled and rapidly loses its activity, necessitating frequent and uneconomical replacement of the catalyst body. Moreover, the hydrogen chloride is diluted by the entire reaction mixture so that it is impossible to secure even fairly complete utilization of the hydrogen chloride without introducing economically excessive quantities of methanol into the reaction mixture. As a further disadvantage, under the conditions maintained in the reaction between the methanol and by-product hydrogen chloride, the higher halides of methane present, i. e. methylene chloride, chloroform, and carbon tetrachloride, react with the steam produced as by-product in the hydrogen chloride-methanol reaction. The net effect is a decrease in the yield of these higher halogenated methane derivatives, which, to some extent, offsets the advantages resulting from utilizing the by-product hydrogen chloride to form further amounts of methyl chloride.

I have now found that the advantages incident to the utilization of by-product hydrogen chloride wherein it is reacted with methanol to form further amounts of chlorinated products may be retained, at the same time avoiding the disadvantages inherent in previously available procedures. This is accomplished by a new and improved process for handling the reaction products of the chlorination system and for converting the by-product hydrogen chloride by reaction with methanol to methyl chloride.

Accordingly, it is one object of my invention to provide an improved process for the preparation of the higher chlorides of methane; namely, methylene chloride, chloroform, and carbon tetrachloride, which will permit the utilization of by-product hydrogen chloride in the formation of further amounts of chlorinated hydrocarbon without the disadvantages incident to previous attempts to utilize the by-product hydrogen chloride. Another object of my invention is to provide a new and improved method for the manufacture of the higher halides of methane wherein the by-product hydrogen chloride is economically utilized to form valuable products in a cyclic process under circumstances wherein fouling and inactivation of the catalytic mass is avoided. Still another object of my invention is the provision of a method wherein this by-product hydrogen chloride can be utilized under circumstances wherein dilution of the hydrogen chloride content of the reaction mixture is avoided and objectionable side reactions between the higher chlorinated halides of methane and by-product steam do not occur. These and still other objects of my process will be apparent from the ensuing disclosure of certain illustrative preferred embodiments thereof.

In carrying out my improved procedure, methane, methyl chloride, or mixtures of these two compounds in various proportions, are reacted with chlorine in the usual manner, utilizing the high temperature noncatalytic method, the moderately elevated temperature catalytic method, or the reaction as carried out at relatively low temperatures in the presence of actinic radiation. The manner of carrying out all these chlorinations is fully understood in the art, and no detailed explanation thereof is necessary. The reaction gases coming from the chlorination chamber are, in accordance with my improved method, passed directly into a fractionation column. At the top of this column the gas mixture is subjected to a temperature low enough to cause condensation of the major portion of the desired product, the higher halides of methane, present therein. The condensate is allowed to flow back through the column and is collected in the receiver at the base of the fractionation column. This receiver is maintained at a temperature sufficiently high to insure the removal of substantially all the hydrogen chloride present, as well as a major portion of the unreacted methyl chloride.

The condensation of the major portion of higher halides of methane at the top of the fractionation column, and the separation out of the reaction product of substantially all the gaseous constituents thereof, i. e. the hydrogen chloride and the major portion of the methane or methyl chloride, I readily accomplish by maintaining a temperature gradient throughout the column.

The actual temperature to which the top of the column must be cooled in order to effect substantially complete removal of the higher chlorides of methane will depend on the nature of the chlorination. For example, if the reaction involves the chlorination of methyl chloride alone, with the use of some 1 to 3 mols chlorine per 5 mols methyl chloride, temperatures of $-18°$ C. to $-24°$ C. are suitable to insure removal of 90–95 per cent of the higher halides of methane from the off-gas issuing from the fractionating column. On the other hand, if methane-methyl chloride mixtures are being chlorinated, temperatures of $-50°$ to $-70°$ C. may be required; or, if desired, the fractionation column may be operated under pressure at somewhat higher temperatures.

The actual temperature under any given set of conditions should be such that 90–95 per cent of the higher halides of methane are removed from the off-gas from the top of the column.

At the bottom of the fractionation column a temperature sufficient to ensure separation of the hydrogen chloride and a major portion of the methyl chloride constituent is satisfactory, a temperature of approximately 40° to 50° C., for example, giving very efficient results.

It is thus possible to withdraw from the receiver an anhydrous, essentially acid-free mixture of the higher halides of methane which, from that point on, may be handled in ordinary steel equipment under substantially atmospheric pressure. At the same time there is secured from the top of the fractionation column a mixture consisting essentially of hydrogen chloride together with the unchlorinated starting materials, whether those starting materials be methane, methyl chloride, or a mixture of the two. This gaseous mixture from the top of the fractionation column is then admixed with methanol in quantity approximately equivalent to the hydrogen chloride present therein, and the combined gaseous mixture then passed into a suitable reaction zone where the methanol and hydrogen chloride react to form methyl chloride and water. The water, together with traces of unreacted methanol, may then be removed from the gas stream by an appropriate means, the major portion of the unreacted hydrogen chloride being dissolved therein and removed therewith. It is not, however, necessary to remove the unreacted hydrogen chloride. The gaseous mixture, now enriched by the newly formed methyl chloride is recycled to the chlorination unit.

It is apparent from the process as described that each of the difficulties inherent in previous attempts to utilize by-product hydrogen chloride in the formation of further amounts of chlorinated products has been overcome by the scrubbing action occurring in the fractionation column. The particles of free carbon present, together with high boiling condensation products and tars, are scrubbed from the mixture which is to be fed to the catalyst mass employed in the preparation of additional methyl chloride. As a result the catalyst mass retains its activity indefinitely. Furthermore, a considerable concentration of the hydrogen chloride present in the gaseous mixture has been effected by the removal from the mixture of the higher halides of methane, thus permitting greater utilization of the by-product hydrogen chloride. It will also be evident that the higher halides of methane are never subjected to the action of steam at high temperatures, and, as a result, they are not decomposed by reaction therewith, there being thus obtained an improved yield of these higher halides. Other and additional advantages reside in the separation of these higher halides of methane in a form in which they may be readily handled in steel equipment at atmospheric pressure, due to the substantially complete removal therefrom in the process of the hydrogen chloride and low boiling raw materials, such as methane or methyl chloride, initially present therein.

In the appended claims the term higher chlorides of methane is to be understood as including all chlorides of methane containing a percentage of chlorine higher than that present in methyl chloride.

The above description is intended to be illustrative only. Any modifications of or variations therefrom which conform to the spirit of the invention are intended to be included within the scope of the appended claims.

I claim:

1. The process of preparing the chlorides of methane which comprises reacting a material selected from the group which consists of methyl chloride and mixtures of methyl chloride and methane with chlorine; cooling the resultant gaseous reaction product, condensing the higher chlorides of methane, scrubbing the uncondensed portion of said reaction product with the condensed portion so as to substantially completely remove high boiling products, carbon and tars from said uncondensed portion while maintaining the hydrogen chloride and a major portion of the methyl chloride in the gaseous phase; adding methanol to said gaseous portion and passing the resulting gaseous mixture in contact with a catalytic mass promoting reaction between methanol and hydrogen chloride at an elevated temperature, thus forming methyl chloride and water; removing water and unreacted methanol from the resulting gaseous reaction product; and returning said purified gaseous reaction product to prepare further amounts of the chlorides of methane.

2. The process for preparing the chlorides of methane which comprises reacting a material selected from the group which consists of methyl chloride and mixtures of methane and methyl chloride with chlorine; cooling the resultant gaseous reaction product, condensing the higher chlorides of methane, scrubbing the uncondensed portion of said reaction product with the condensed portion so as to substantially completely remove high boiling products, carbon and tars; separating out said condensed portion, high boiling products, carbon and tars from said uncondensed portion while maintaining the hydrogen chloride and a major portion of the methyl chloride in the gaseous phase; adding methanol to said uncondensed portion and passing the resulting gaseous mixture in contact with a catalyst mass promoting reaction between methanol and hydrogen chloride at an elevated temperature, thus forming methyl chloride and water; and removing water and unreacted methanol from the resulting gaseous product, and returning the purified gaseous reaction product to prepare further amounts of the chlorides of methane.

OLIVER W. CASS.